United States Patent [19]

Anderson et al.

[11] Patent Number: 5,070,466

[45] Date of Patent: Dec. 3, 1991

[54] DIGITAL VECTOR GENERATOR APPARATUS FOR PROVIDING MATHEMATICALLY PRECISE VECTORS AND SYMMETRICAL PATTERNS

[75] Inventors: Bruce M. Anderson, Phoenix, Ariz.; Brian E. Broderick, New Palestine, Ind.

[73] Assignee: Honeywell Inc., Minneapolis, Minn.

[21] Appl. No.: 266,048

[22] Filed: Nov. 1, 1988

[51] Int. Cl.[5] .......................... G09G 1/16; G06F 3/14
[52] U.S. Cl. .................................. 395/143; 364/937.7; 364/931.51; 364/DIG. 2; 340/739
[58] Field of Search ... 364/200 MS File, 900 MS File, 364/518, 520, 521, 522, 719; 340/739, 744, 747, 732

[56] References Cited

U.S. PATENT DOCUMENTS

| | | | |
|---|---|---|---|
| 3,629,841 | 12/1971 | Hare | 364/900 |
| 3,649,819 | 3/1972 | Waller | 364/521 |
| 3,996,585 | 12/1976 | Hogan et al. | 364/900 |
| 4,027,148 | 5/1977 | Rosenthal | 364/719 |
| 4,053,740 | 10/1977 | Rosenthal | 364/900 |
| 4,093,996 | 6/1978 | Hogan et al. | 364/900 |
| 4,115,863 | 9/1978 | Brown | 364/521 |
| 4,125,873 | 11/1948 | Chesasek | 364/900 |
| 4,442,503 | 4/1984 | Schütt et al. | 364/900 |
| 4,481,605 | 11/1984 | Chase | 364/719 |
| 4,580,236 | 4/1986 | Tsujioka et al. | 364/900 |
| 4,612,540 | 9/1986 | Pratt | 340/793 |
| 4,667,306 | 5/1987 | Smith | 364/900 |
| 4,808,988 | 2/1989 | Burke et al. | 340/744 |

Primary Examiner—Michael R. Fleming
Assistant Examiner—Gopal C. Ray
Attorney, Agent, or Firm—Seymour Levine; Roger W. Jensen; Albin Medved

[57] ABSTRACT

The vector generator employs a digital accumulator for each vector component. The accuracy of generated vectors is optimized by presetting the fractional portions of the accumulators to a value of either ½ or to ½ less 1 LSB. Accumulation of errors over concatenated vectors is eliminated by employing high enough fractional resolution relative to the maximum vector length so that error accumulation on any single vector is limited to the fractional portions of the accumulators, and by setting the fractional portions of the accumulators, on the last clock cycle of each vector, to a value of ½ to ½ less 1 LSB. Also, by setting/presetting the fractions to only ½ less 1 LSB, and by enabling the carry input to a given accumulator on only the first clock cycle of vectors that have certain orientations, then symmetry is forced or favored in complex symbology that is generated by concatenated vectors.

19 Claims, 3 Drawing Sheets

DIGITAL VECTOR GENERATOR APPARATUS FOR PROVIDING MATHEMATICALLY PRECISE VECTORS AND SYMMETRICAL PATTERNS

BACKGROUND OF THE INVENTION

1. Field of the Invention

The invention relates to digital vector generators, specifically as applied to electronic displays.

2. Description of the Prior Art

Digital vector generators are utilized in the art in various applications, including electronic displays. For example, they are used for: raster scanned or caligraphically generated cathode ray tube displays; X-Y plotters; numerically controlled machines; and robotics. Known vector generation procedures utilize either open-loop or closed-loop curve generation techniques. Open-loop techniques are often advantageous because various vector instruction formats may be incorporated which share the same basic hardware. For example, with open-loop techniques, both polar coordinate and rectangular coordinate vector formats can be effectively utilized. The execution of polar coordinate vectors can generally simplify the rotation of symbology. Additionally, the open-loop algorithm permits achieving constant velocity vector generation, independent of vector angle. Constant velocity vector generators can provide for the generation of dotted and dashed vector patterns that do not change as a function of vector angle.

For the rectangular coordinate system, two-dimensional open-loop vector generation is generally implemented utilizing two accumulators for the X and Y coordinate axes, respectively, of the vector generation system. To generate a vector, the accumulators are loaded with the X and Y coordinates of the initial point of the vector. The vector is then generated by adding the incremental values of DX/N and DY/N to the respective accumulators during each of N clock cycles, where DX is the X component of the vector and DY is the Y component thereof. Generally, each accumulator has an integer portion and a fractional portion, where the integer portions provide the vector generator outputs that select the picture elements (pixels) to be illuminated for displaying the vector. This technique of vector generation is denoted as open-loop negative integration. Although the subject invention will be described for the application of two-dimensional vector generation, open-loop vector generation is easily extended to three-dimensional space by the addition of a third accumulator. It should be appreciated that the improvements of the invention are also applicable to three-dimensional vector generation.

Open-loop integration generally utilizes either the tangent algorithm or the sine/cosine algorithm. In the tangent algorithm, the accumulator corresponding to the axis of the largest vector component is advanced by one integer unit or every clock cycle and the other accumulator is advanced by the tangent of the vector angle. In the sine/cosine algorithm, the X and Y coordinates are advanced on each clock cycle by the cosine and sine, respectively, of the vector angle. An example of a tangent algorithm vector generator that may be configured in accordance with the present invention is disclosed in U.S. Pat. No. 4,115,863; issued Sept. 19, 1978; entitled "Digital Stroke Display with Vector, Circle and Character Generation Capability." An example of a sine/cosine vector generator that may be configured in accordance with the present invention is disclosed in U.S. Pat. No. 4,481,605; issued Nov. 6, 1984; entitled "Display Vector Generator Utilizing Sine/Cosine Accumulation". Said U.S. Pat. Nos. 4,115,863 and 4,481,605 are incorporated herein by reference.

With vector generation utilizing open-loop integration, truncation errors in the incremental values that are added to the X and Y accumulators can result in an accumulation of errors as vectors are generated. Utilizing open-loop integration results in a compromise to the accuracy of the displayed symbology causing a degradation in display quality. Such degradation in accuracy results in the illumination of pixels that are not located on the mathematical locus of the desired vector, resulting in, for example, line ends that do not meet and open curves that should be closed. The truncation errors that result in these display anomolies are inherent in digital vector generation apparatus utilizing open-loop integration.

Truncation errors can be eliminated by utilizing a closed-loop vector algorithm which is inherently self-correcting and in which the maximum error is inherently bounded. In closed-loop vector generation, the error does not increase with vector length. The closed-loop algorithms, are however, incompatible with vector instructions that utilize the polar coordinate system to simplify the rotation of symbology. The inherent advantage of polar vectors for the rotation of symbology can outweigh the error problems due to truncation and coordinate transformation. Additionally, as discussed above, constant velocity vector generation cannot readily be achieved utilizing a closed-loop algorithm.

SUMMARY OF THE INVENTION

The present invention permits vector generation with open-loop algorithms that is free from the anomolies that normally result from truncation errors. This is accomplished by presetting the accumulator fractional portions to a value of one-half, or to one-half less 1 LSB, prior to the generation of each vector, and by limiting the maximum vector length relative to the accumulator fractional resolution.

The presetting of the accumulator fractional portions provides mathematically perfect vectors in the absence of truncation errors. When truncation errors are present, the fractional presetting and the limiting of the maximum vector length restricts the error at the vector end point to the fractional bits of the accumulator. Presetting of the fractional accumulator bits prior to the generation of each vector eliminates the buildup of truncation errors over consecutive vectors. Also, a further limitation of the maximum vector length ensures the generation of mathematically perfect vectors utilizing the tangent algorithm.

The present invention also forces the generation of symmetrical patterns when vectors are concatenated to generate complex symbology. Symmetry is forced by, in effect, controlling the fractional accumulator presetting to either one-half or to one-half less 1 LSB. This is achieved by always presetting to one-half less 1 LSB and then conditionally enabling the carry input to the accumulators, on the initial clock cycle of a vector, as a function of the octant in which the vector angle resides. Additionally, complex symbology is generated without error accumulation and without a requirement for initiating the accumulators between vectors as a means of preventing error accumulation.

DESCRIPTION OF THE PREFERRED EMBODIMENTS

The present invention modifies the basic technique of open-loop vector generation so as to eliminate the errors that normally result therefrom. A two-dimensional vector in the rectangular coordinate system can be generated with two digital accumulators, one for the X axis and one for the Y axis. A vector is generated by adding an incremental value DX/N to the X accumulator and an incremental value DY/N to the Y accumulator on each of the N clock cycles. Since the fractional portions of the accumulators are of a finite size, the DX/N and DY/N. values that are added thereto can include truncation errors. Errors can therefore increase in the X and Y accumulators over a number of clock cycles until the integer values thereof, which are the vector generator outputs, are in error. Since the probability of an integer error increases with the number of clock cycles, errors will be prevalent when vectors are concatenated to generate extensive complex symbology. The present invention, however, eliminates error accumulation over the generation of multiple vectors by assuring that no integer error can occur at the end point of any single vector, and by resetting the fractional portion of each accumulator on the last clock cycle of every vector in order to discard any error that has accumulated. The present invention also generates mathematically perfect vectors using the tangent algorithm, provided that the fractional resolution of the accumulators is sufficiently high relative to the length of the generated vector. A mathematically perfect vector has no integer error at any point thereof. The invention also provides additional modifications to the open-loop vector generator that can force the generation of symmetrical patterns when vectors are concatenated to generate complex symbology.

In the most general approach to a hardware vector generator, using the technique of open-loop integration, an accumulator device is used for each vector axis. Thus, two accumulators are required for two-dimensional vector generation, and three are required for three-dimensional vector generation. Input data buffer registers, one for each accumulator, can be used to hold the incremental values that are added to each respective accumulator on every clock cycle during the generation of a given vector. In order to control the number of clock cycles that are used in the generation of a given vector, a counter circuit is also employed.

The hardware circuitry comprising: the set of accumulators; the input data buffer registers; the length counter; and all required control logic, together constitute a vector execution circuit. A low-cost vector generator system might incorporate a general-purpose microcomputer along with such a vector execution circuit. The microcomputer can execute output instructions in order to transfer the required data parameters to the vector execution circuit and to initiate each vector generation operation. This approach to vector generation is, however, rather limited in its performance. For high throughput vector generation, a special purpose processor is often employed.

Figure 1:
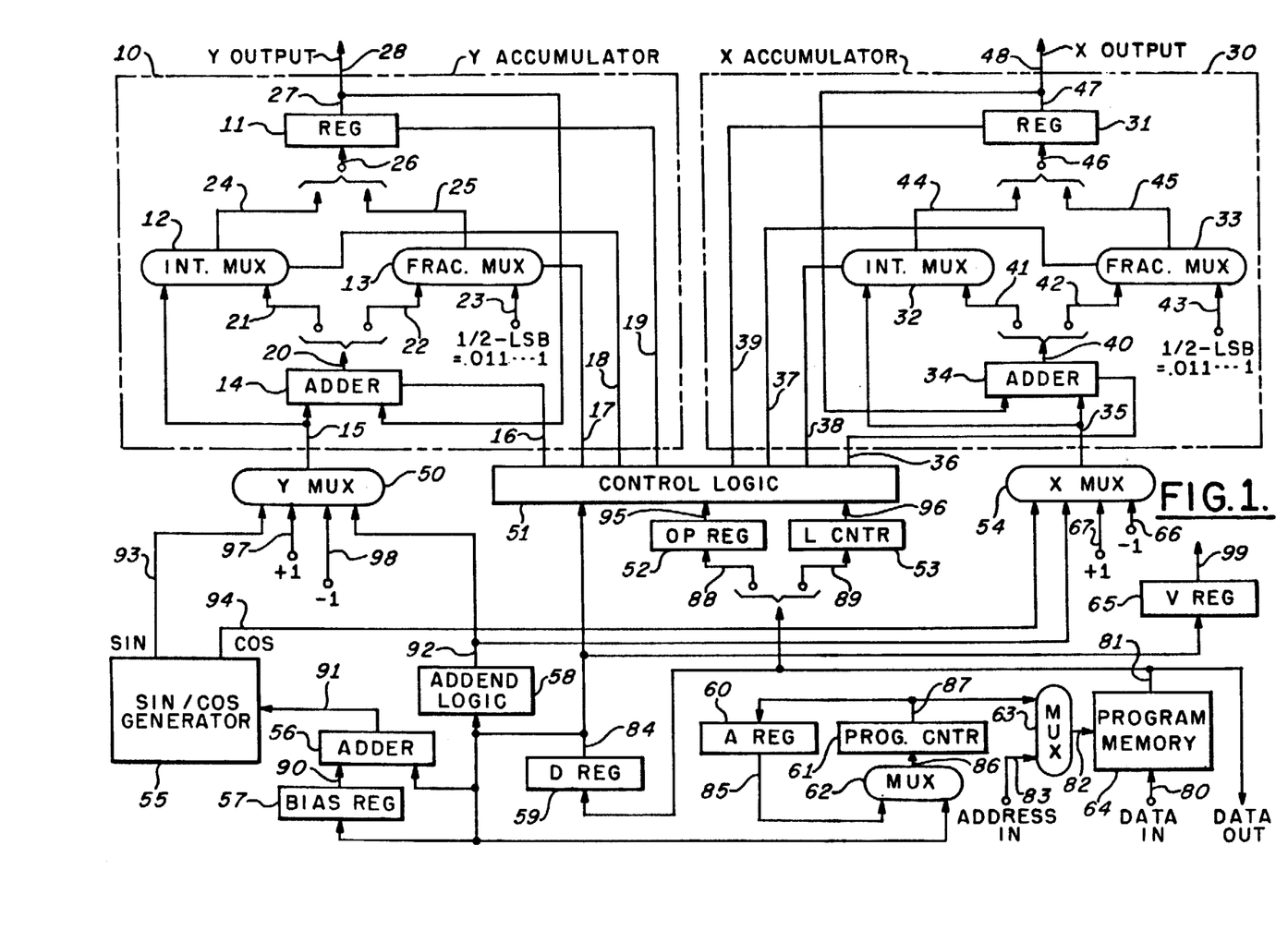
FIG. 1 is a schematic block diagram of a vector processor utilizing open-loop integration implemented in accordance with the present invention.
Figures 1A, 4, 6:
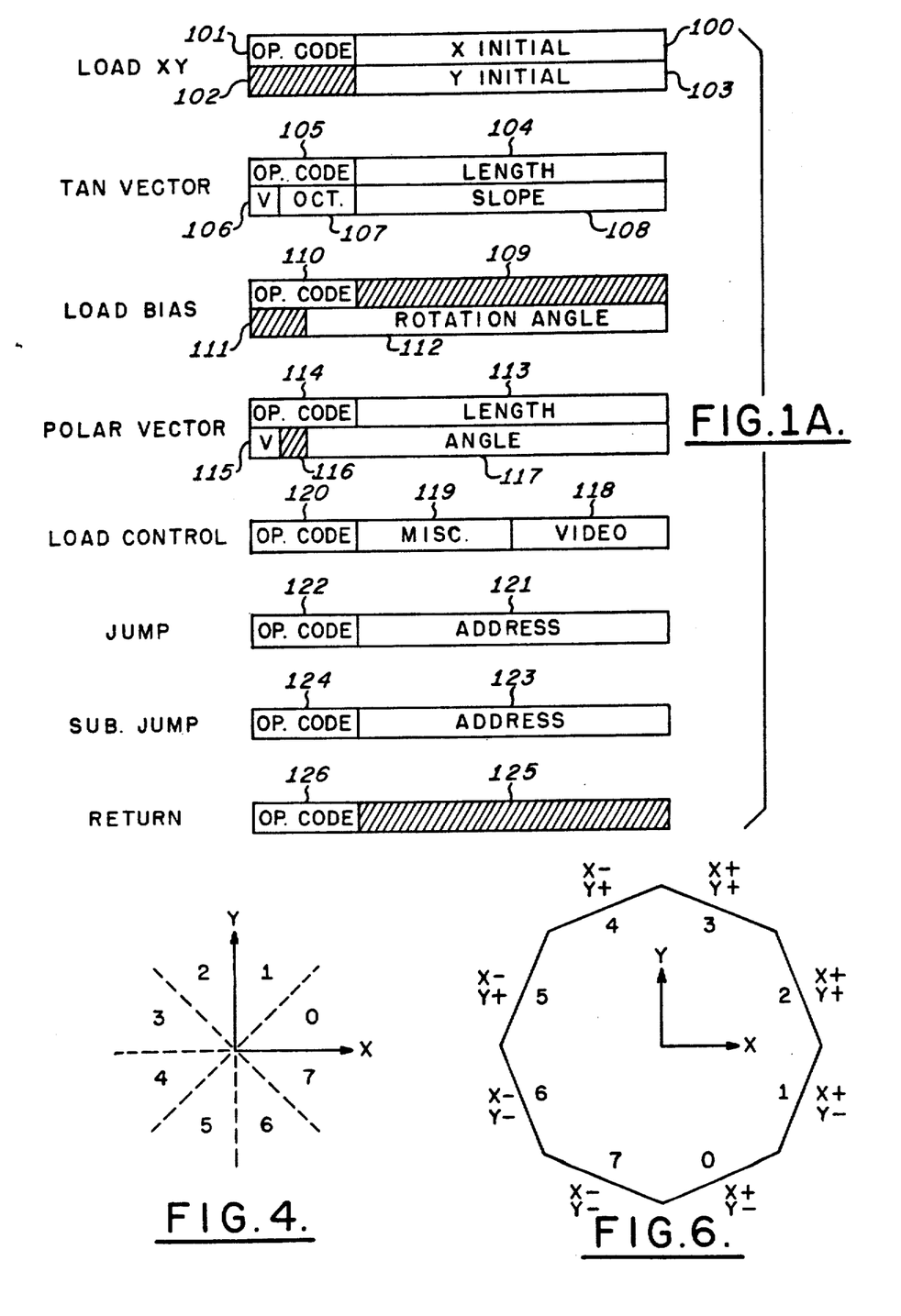
FIG. 1A is a chart illustrating the formats of the various instructions that can be executed by the hardware of FIG. 1 of the present invention.
FIG. 4 is a diagram of the cartesian coordinate octant definitions utilized in the symmetrical algorithms of the present invention.
FIG. 6 is an annotated octagonal chart useful in explaining the operation of the symmetrical algorithms of the present invention.

FIG. 1 is a block diagram of a special purpose processor that is designed to execute vector instructions in accordance with the invention. It is designed for execution of the instruction types that are illustrated by FIG. 1A. The vector processor of FIG. 1 is designed for two-dimensional vectors. Accordingly, it incorporates two accumulators. The X accumulator 30 and the Y accumulator 10 are identical in design. The X accumulator incorporates a register 31 whose integer and fractional inputs are derived, respectively, from separate integer 32 and fractional 33 multiplexers. Also included in the X accumulator is an adder 34 whose inputs consist of the X register output 47 and an incremental value that is derived from the output 35 of an X multiplexer 54 that is external to the X accumulator. The range of values for the incremental input is generally of less magnitude than the range of values of the X register output. However, the value 35 from the X multiplexer 54 can be sign extended so that the incremental input to the adder has the same number of bits as does the X register.

Although the X register output 47 incorporates both integer and fractional bits, only the integer portion thereof is used as the accumulator output 48. Similarly, for the Y accumulator 10, only the integer portion 28 of the Y register output 27 is used as the accumulator output. For the application of a display symbol generator for a raster scanned display, the X 48 and Y 28 outputs are normally used to address a two-dimensional display image memory for the purpose of writing vectors into said memory. For a caligraphic CRT display, the X and Y outputs are each converted to an analog signal. These analog signals then control the position of the electron beam of the CRT for directly "writing" vectors onto the CRT display screen.

All the registers and counters of FIG. 1 can be loaded or advanced, as required, on the same edge of a single clock signal, thereby allowing the use of a single phase clock. During an instruction fetch cycle, the address of the instruction to be executed is held in the program counter 61. The output of the program counter 87 is gated through the multiplexer 63 to the address input 82 of the program memory 64. At the end of the instruction fetch cycle, the transition of the single phase clock signal will increment the program counter so that during the next clock cycle the program counter will hold the program memory address of the next sequentially higher location in the memory. Said memory location may contain the next instruction to be executed or may contain the second word of the instruction that was just fetched.

Note that each of the instruction formats of FIGS. 1A incorporates an operation code field that is always located in the more significant bits of a single-word instruction 120 or in the more significant bits of the first word of a two-word instruction 101. At the end of an instruction fetch cycle, the instruction word (or the first work of a two-word instruction) is available on the data output 81 of the program memory 64. The transition of the clock signal at the end of the instruction fetch cycle loads the entire instruction word into the D register 59. Also, the operation code bits of the instruction word 88 are loaded into the OP code register 52; and the lower bits of the instruction word 89, that are used for a length count in the TAN vector instruction 104 and in the POLAR VECTOR instruction 113, are loaded into the L counter 53.

The output 95 of the OP code register 52 is used by the control logic 51 during each instruction execution sequence in order to derive the control signals that are required for the proper execution of the instruction. The control signals required of the two accumulators are shown in FIG. 1. However, in the interest of simplicity, the control signals to the other blocks of FIG. 1 are not depicted. The control signals to the X accumulator consist of: A carry input 36 to the least significant bit of the adder 34; A select input 37 to the fractional multiplexer 33 to control whether the fracitonal portion 42 of the adder output 40 or the fixed binary value 43 of 0.0111 ... 1 is gated to the multiplexer output 45; A select input 38 to the integer multiplexer 32 to control whether the integer portion 41 of the adder output 40 or the accumulator input 35 is gated to the multiplexer output 44; and a gated clock signal 39 for conditionally loading the register 31 of the X accumulator at the end of a given clock cycle. An alternative to the use of a gated clock signal 39 would be to employ a type of register that makes use of the primary clock signal, which is active on every cycle, along with an enable signal that determines the cycles on which the register is to be loaded.

The reference numerals 11-28 denote components in the Y accumulator 10 identical to those described with respect to the X accumulator 30.

The preferred embodiment of the invention uses the binary two's complement number system. The accumulators of FIG. 1 incorporate features that are specifically designed to accommodate the invention. One such feature is the conditional carry input to the two's complement adder of each accumulator. Another is the use of the constant value 0.0111 ... 1 for the initial value of the fractional portion of the accumulator. Still another is the use of separate multiplexers for independently selecting the fractional and integer inputs to be loaded into the accumulator register.

On the first cycle of either a jump instruction or a subroutine jump instruction, the lower bits of the D register output 84, that correspond to the address field bits of the jump instruction 121 or of the subroutine jump instruction 123, are gated through the multiplexer 62 to the input 86 of the program counter 61 and loaded into the program counter at the end of the first clock cycle of the respective instruction. The second clock cycle of these instructions is an instruction fetch cycle. It loads the next instruction that is to be executed, which is located at the program memory address previously loaded into the program counter. Also, for the subroutine jump instruction, the output of the program counter 87 is loaded into the A register 60 at the end of the first clock cycle. This saves, in register A, the address of the instruction that follows the subroutine jump instruction. On the first cycle of a return instruction, the A register output 85 is gated through the multiplexer 62 to the program counter input 86 and is loaded into the program counter at the clock transition occurring at the end of said first cycle. The second cycle of a return instruction is an instruction fetch cycle. The return instruction is therefore followed by the execution of the instruction that immediately follows the most recently executed subroutine jump instruction. It should be appreciated that if multiple levels of subroutines are required (i.e., nested subroutines), then the A register 60 can be replaced with a last-in-first-out register stack.

The load control instruction requires only a single clock cycle for execution. In addition to being an instruction fetch cycle, this single clock cycle also loads the V register 65 with the lower bits of the output 84 from the D register. These bits correspond to the miscellaneous field 119 and the video field 118 of the load control instruction word. The output of the V register 99 can be used to control the video intensity and/or the color of displayed vectors. Some of the V register output bits (e.g., those corresponding to the miscellaneous bits 119) might also be used to enable/disable a video modulation for the generation of vectors having a selectable dotted or dashed pattern.

On the first clock cycle of a load bias instruction, the second word of the instruction, which contains the rotation angle 112, is loaded into the D register from the output 81 of the program memory. The program counter 61 is also incremented in order to address the next instruction. The second clock cycle is an instruction fetch cycle, and it also loads the bias register 57 with the output 84 of the D register. The bias register is used with polar vector instructions to cause a rotation of the generated vectors.

The load XY instruction is used to load an initial X value 100 and an initial Y value 103 into the X and Y accumulators, respectively. On the first clock cycle of the instruction execution, the output 84 of the D register is gated through the addend logic 58 to the input 92 of the X multiplexer 54. It is also gated through the X multiplexer 54 to the input 35 of the integer multiplexer 32, gated through the integer multiplexer to the integer portion 44 of the input 46 to the register 31 of the X accumulator, and loaded into the integer portion of said register 31 at the end of the cycle. Also, the value 0.011 ... 1 is gated through the fractional multiplexer 33 to the fractional portion 45 of the input 46 to the register 31 of the X accumulator, and it is loaded into the fractional portional of said register at the end of the cycle.

also on the first clock cycle of the load XY instruction, the second word of the instruction, which includes the initial value of Y 103, is transferred from the program memory to the D register. The program counter is also incremented. The second clock cycle is an instruction fetch cycle. Also on the second clock cycle, the D register is gated through the addend logic 58, the Y multiplexer 50, and the Y integer multiplexer 12, and is loaded into the integer portion of the register 11 of the Y accumulator. The value 0.011 . . . 1 is also gated through the Y fractional multiplexer 13 and loaded into the fractional portion of the register 11 of the Y accumulator.

On the first clock cycle of either the tan vector or the polar vector instruction, the program counter 61 is incremented and the second word of the respective instruction is transferred from the program memory to the D register. Note that the length parameter for the tan vector instruction 104, or for the polar vector instruction 113, which specifies the number of accumulation cycles to be used in generating the given vector, would have been loaded into the L counter on the clock cycle that was used to fetch the respective instruction.

After the first clock cycle of the instruction execution sequence, the incremental values that are to be added to the two accumulators are generated. The correct incremental value to be added to the X accumulator is gated through the X multiplexer 54 to the X accumulator input 35. Similarly, the correct incremental value to be added to the Y accumulator is gated through the Y multiplexer 50 to the Y accumulator input 15. Because of the time required for these incremental values to be generated and to become stable at the respective accumulator inputs, the first accumulation clock cycle will occur at the third clock cycle of the vector instruction execution. For a single step vector, which is determined by the value in the L counter 53, this third clock cycle would also be the last clock cycle of the instruction execution, and would therefore be an instruction fetch cycle. For vectors with multiple steps, the accumulation clock cycles are repeated, with the L counter decremented at each said clock cycle, until the value in the L counter indicates the occurrences of the last accumulation clock cycle, which is also an instruction fetch cycle.

For the tan vector instruction, the incremental addend value to at least one of the accumulators will be either +1 or −1. The octant code 107 for the vector, which is contained in the D register 59 and which is an input 84 to the control logic 51, determines whether the X multiplexer 54 or the Y multiplexer 50, shall gate the fixed value of either +1 or −1 to its respective output. The octant code also determines which of these two values is to be gated. The other of these two multiplexers will gate the output 92 from the addend logic 58. The slope value 108 consists of only the fractional portion of the two's complement incremental value that is the correct input to the appropriate accumulator. The integer bits for this input are appended to the fractional bits by the added logic 58, and they are a function of the octant code. For most cases, the integer bits will be all ones or all zeroes, according to the sign of the incremental value as is determined by the octant code. However, the value of +1 or −1 is required for vectors that are oriented at an angle of exactly 45° from either the X or the Y axis. Note that the octants are defined so that a given octant includes only one of the three values: 0; +1; or −1, as possible slope values. For any of these values, and for only these values, all of the bits of the fractional slope 108 are equal to zero. Therefore, the correct integer bits can be appended to the fractional slope value by the addend logic as a function of the octant code and a function of whether or not the fractional slope bits are all equal to zero.

The polar vector instruction is designed to allow the simple rotation of symbology by automatically rotating all polar vectors by a rotation angle 112 that is held in the bias register 57 as a result of the execution of a load bias instruction. The angle 117 of a polar vector is loaded into the D register 59 on the first clock cycle of the instruction execution, and it is then added to the output 90 of the bias register 57 in the adder 56. The output 91 of the adder 56, which is the correct angle for the rotated vector, is the input to a SIN/COS generator 55. The SIN/COS generator can be implemented, for example, with read-only-memories, using the table-look-up technique. For the polar vector instruction, the COS output 94 of the SIN/COS generator is used for the addend input to the X accumulator and it is therefore gated through the X multiplexer 54. The SIN output 93 is used for the addend to the Y accumulator, and it is gated through the Y multiplexer 50. The first accumulation clock cycle for the polar vector instruction occurs on the third clock cycle of the instruction execution, as was the case for the Tan instruction. The last accumulation clock cycle, as determined by the value of the L counter, is also an instruction fetch cycle.

By loading the fractional value of 0.0111 . . . 1 into the fractional portions of the accumulator registers 11, 31 on the load XY instruction, the invention improves the accuracy of vectors generated with both the tan vector instruction and the polar vector instruction. The accuracy of vectors generated with the tan vector instruction are further improved by loading the value of 0.011 . . . 1 into the fractional portions of the accumulator registers on the last accumulation clock cycle of each vector, which also loads the integer portion of the register with the integer portion of the output from the accumulator adder 14, 34. Because the number of fractional accumulator bits is made large enough relative to the maximum number of accumulation clock cycles for any vector, the effect of the above technique is to eliminate all errors at the end points of vectors that are drawn with the tan vector instruction. Also, when the fractional resolution is sufficient, errors at any point along a vector are eliminated. The invention also forces, or favors, the generation of symmetrical symbology using concatenated tan vector instructions, by selectively enabling the carry inputs 16, 36 to the accumulator adders 14, 34 on only the first accumulation clock cycle of some vectors, whereby said enabling is, for each accumulator, a function of the octant 107 of the vector.

The program memory 64 of the vector processor is designed to be time-shared by the vector processor and by a general purpose processor (not shown). The memory address 83 from general purpose processor can be gated through the multiplexer 63 to the address input 82 of the program memory. Data 80 from the general processor can be written to the program memory so that the general processor can store a program in the memory for subsequent execution by the vector processor.

It should be appreciated that various techniques could be used to improve the performance of the vector processor shown in FIG. 1. For example, two independent program memories might be used so that memory access conflicts between the vector processor and the general processor could be eliminated. Also, the vector execution hardware (i.e., the accumulators, L counter, and required control logic).might be designed independently from the instruction fetch and format hardware. With buffer registers, or first-in-first-out memory, between the hardware of these two functions, the vector execution operation could occur simultaneously with the fetching and formatting of new instructions, thereby improving over-all throughput. The instruction set of the vector processor, FIG. 1A, might also be expanded. For example, it could include a SIN/COS type of vector instruction. General purpose instruction types (e.g., Add, Subtract, Load, Store) could also be included in the instruction set.

As discussed above, only the integer portions of the X and Y accumulators are used as outputs. For the application of a raster CRT display system, the X and Y outputs are utilized to address a two-dimensional display-image memory. The vector generator stores a complete image in the memory by writing the appropriate sequence of vectors. The memory is then read out in synchronization with the display raster scan in order to provide the video information to refresh the display. In real-time applications, two image memories may be utilized so that the vector generator can update the display image in one memory while the second memory is utilized to provide the display video information. The functions of the memories are interchanged when the vector generator completes an updated version of the display image. For many other applications, such as for a caligraphic CRT display or a numerically controlled machine, analog X and Y signals are required. In these applications, the integer portions of the X and Y accumulators are applied as inputs to digital-to-analog converters.

A nominal magnitude of one integer unit is often used for the incremental step size on each of the N clock cycles utilized to generate a vector. This requires a minimum range from −1 to +1, inclusive, for the DX/N and DY/N inputs to the accumulators of FIG. 1. A general purpose design, however, may require a significantly larger range for these inputs. For example, one design may be utilized in several applications that have different resolution requirements. A low resolution application does not require the entire integer portions of the X and Y accumulators as outputs, and may utilize only the more significant bits of these integers. The less significant integer bits (i.e., those not being used for the X and Y outputs) are loaded with the value zero when the X and Y accumulators are initialized. The DX/N and DY/N inputs would then be increased in magnitude for such low-resolution applications in order to achieve an adequate incremental step size at each clock cycle of a vector. High-resolution applications, in particular those utilizing analog X and Y output signals, can also make use of a larger than normal step size in order to increase the speed at which vectors are drawn.

For the tangent vector algorithm and the sine/cosine vector algorithm, two different approaches are normally utilized for determining the number of clock cycles, N, to be used in generating a vector. For the tangent algorithm, the value of N is normally provided by the absolute magnitude of DX or the absolute magnitude of DY, whichever is the larger. For example, if $|DX| \geq |DY|$, then N is given by: $N=|DX|$; and the incremental values added to the X and Y accumulators are, respectively, DX/|DX| (i.e., either +1 or −1) and DY/|DX|. The value added to the Y accumulator in this case is equal in magnitude to the tangent of the acute angle defined by the intersection of the desired vector with the X axis, hence the designation of tangent algorithm. Scaled versions of the tangent algorithm, for example, where N is given by twice the larger of |DX| or |DY| or by approximately ½ the larger of |DX| or |DY|, will not be described. It is appreciated, however, that the invention is applicable to such variations of the tangent vector algorithm.

For the unscaled tangent algorithm, at least one of the accumulators is advanced by exactly one integer unit on each clock cycle of a vector. For a 45° vector, both accumulators are advanced by one integer unit on each clock cycle. With the tangent algorithm, the magnitude of the incremental step size at each clock cycle of a vector is a function of the vector angle. The incremental step size varies from a magnitude of 1, for a horizontal or vertical vector, to a magnitude of the square root of 2, for a 45° vector. The magnitude of the velocity of the generated vector varies with vector angle in the same manner as does the step size.

The tangent algorithm is inherently more accurate than the sine/cosine algorithm, and it generally results in more aesthetically pleasing vectors. However, because of the variation in step size that occurs with the tangent algorithm, the sine/cosine algorithm is more appropriate for some applications. For example, in some display applications, dotted or dashed vectors are generally by modulating the video signal on and off with a pattern that is controlled by the accumulator clock signal. With the tangent algorithm, the distance over which the dot/dash pattern is repeated, is a function of vector angle. This is due to the variation in step size with vector angle. This problem does not occur with the sine/cosine algorithm, since it has a relatively constant step size.

For the unscaled sine/cosine algorithm, the number of clock cycles used in generating a vector is normally given by: $|DX^2+DY^2|^{\frac{1}{2}}$. This results in a step size of one integer unit regardless of the vector angle. It is appreciated, however, that the number of clock cycles must be an integer, and the value N is actually derived by rounding off the value of $[DX^2+DY^2]^{\frac{1}{2}}$ to the nearest integer.

The present invention improves the accuracy of vectors generated with either the tangent or the sine/cosine algorithms. However, when used with the inherently more accurate tangent algorithm, the invention can generate vectors of the highest possible mathematical accuracy. Although the invention is primarily described herein as applied to the tangent algorithm, it is also applicable to the sine/cosine algorithm.

Prior to discussing further details of the invention, a commonly employed variation in the hardware implementation of the tangent algorithm will now be described. Instead of utilizing two accumulators as illustrated in FIG. 1, the tangent vector algorithm may be implemented with two up/down counters (i.e., one for the X output and one for the Y output) and one accumulator that does not include an integer portion, but only the circuitry required to detect overflow in the adder from the fractional accumulator into the integer portion. As described above with respect to the tangent algorithm, at least one of the outputs (i.e., either X or Y) advances by exactly one integer unit on each clock cycle of the generated vector. This can be implemented by advancing the corresponding X or Y counter of this alternative implementation, either up or down, on each clock cycle. The other counter is advanced only on clock cycles in which the fractional accumulator overflows into the integer units, which would be on every cycle in the case of a 45° vector. The values of the X and Y outputs with this alternate implementation are identical to those of the embodiment of FIG. 1. In applying the invention to this alternative implementation, the fractional accumulator is treated, for any given vector, as the accumulator of FIG. 1 that corresponds to the axis of the smallest vector component.

In order to contrast vector generation in accordance with the prior art and vector generation in accordance with the present invention, the following Table 1 illustrates the generation of a vector in accordance with the tangent algorithm with DX = +3 and DY = −8.

TABLE 1

| CLOCK CYCLE | 1A INITIAL VALUE = 0 | | 1B INITIAL VALUE = 0.5 | |
|---|---|---|---|---|
| | X | Y | X | Y |
| INITIAL | 0 | 0 | 0.5 | 0.5 |
| 1 | 0.375 | −1 | 0.875 | −0.5 |
| 2 | 0.75 | −2 | 1.25 | −1.5 |
| 3 | 1.125 | −3 | 1.625 | −2.5 |
| 4 | 1.5 | −4 | 2.0 | −3.5 |
| 5 | 1.875 | −5 | 2.375 | −4.5 |
| 6 | 2.25 | −6 | 2.75 | −5.5 |
| 7 | 2.625 | −7 | 3.125 | −6.5 |
| 8 | 3.0 | −8 | 3.5 | −7.5 |

Figure 2A:
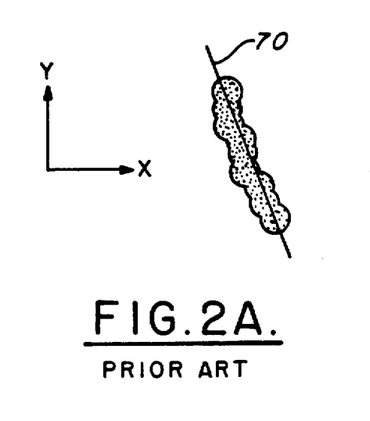
FIG. 2A is an illustration of the generation of a vector in accordance with the prior art.
Figure 2B:
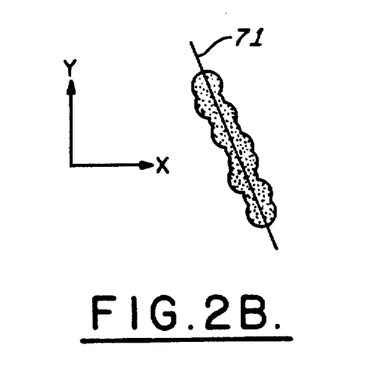
FIG. 2B is an illustration of the generation of a vector utilizing the present invention.

Table 1 delineates the initial values in the X and Y accumulators of FIG. 1 and the values after each of the eight clock cycles utilized to generate the vector. Table 1A provides the X and Y values for the prior art generation of the vector and Table 1B provides the X and Y values for generating the vector with the fractional portions of the X and Y accumulators initialized to the value of ½ in accordance with the invention. FIG. 2A illustrates the pixels illuminated for generating the vector in accordance with the prior art as delineated in Table 1A. FIG. 2B illustrates the vector generated in accordance with the invention as delineated in Table 1B. It is appreciated that only the integer portions of the values delineated in Table 1 are utilized for the outputs that determine the illuminated pixels of the displayed vectors illustrated in FIGS. 2A and 2B. Although the accumulator values in Table 1 are, for convenience, provided in decimal, the vectors displayed in FIGS. 2A and 2B are predicted on a two's complement binary hardware implementation.

The present invention modifies the prior art vector generator to improve the accuracy of the resulting symbology. The first modification is to initialize the fractional portion of the accumulator to a value of ½, or to a value of ½ less the value of the LSB of the accumulator (i.e., where ½ = 0.100 ... 0 and ½ − 1 LSB = 0.011 ... 1, in binary two's complement). For the exemplified vector, this modification results in the accumulator values delineated in Table 1B above and the corresponding vector illustrated in FIG. 2B.

The accuracy of the vector of FIG. 2B, initialized to the value of ½ in accordance with the invention, and the vector of FIG. 2A, initialized to zero in accordance with the prior art, may be compared by lines 71 and 70 drawn between the respective vector end points. The lines 70 and 71 define the location of the actual vector the hardware is attempting to generate. The line 71, compared to the line 70, illustrates that the present invention has generated a more accurate vector than the prior art. In the absence of truncation errors, the present invention illuminates only pixels that are within the distance of ½ the pixel-to-pixel spacing from the actual vector. This is the closest representation of the actual vector that can be achieved with a given display resolution, and it defines a "mathematically perfect vector." The prior art vector generator, which clears the factional portions of the accumulators when the integer portions are loaded, can illuminate pixels that approach a distance of a full pixel-to-pixel spacing from the actual vector.

Since the correct value of DX/N or DY/N can be an irrational number, the actual value that is utilized by the vector generator can incorporate a truncation error. These errors can build up over a number of clock cycles until the integer value of an accumulator is in error. This problem is most likely to occur when consecutive vectors, including blank vectors, are used to generate extensive complex symbology. The result is a degradation in the appearance of the symbology.

A further modification to the prior art vector generator can however, prevent this problem. If the accumulator fractions are initialized to either ½ or to ½ less 1LSB; if the number of fractional bits in the accumulator is K; if the incremental value added to the accumulator is rounded to the nearest LSB (i.e., to the Kth fraction bit); and if the number of clock cycles used to generate the vector is limited to a maximum value of $2^K$; then the error at the vector end point will be restricted to the fracitonal bits of the accumulator. Therefore, by re-initializing the fractional bits of the accumulators on the last clock cycle of every generated vector (i.e., by loading them with ½ or ½ less 1LSB), the build-up of truncation errors over consecutive vectors is eliminated.

The previously described modification to the prior art vector generator generates that, for either the tangent or sine/cosine algorithm, every vector will terminate precisely at its correct end point. Mathematically perfect vectors are, however, not necessarily achieved. Errors can still occur in the integer portions of the accumulators at intermediate points along a generated vector. For the tangent algorithm, these errors can also be eliminated if the fractional resolution of the accumulators is increased relative to the maximum vector length (i.e., the vector length as determined by the maximum number of clock cycles). For example, if the accumulators have K fractional bits, then mathematically perfect vectors are generated for all vectors with the number of clock cycles less than or equal to $2^{K/2}$.

Even with mathematically perfect vectors, a problem arises in the generation of symmetrical symbology. When a given vector lies exactly between two pixels, it is mathematically arbitrary which pixel is illuminated. When, however, vectors are concatenated to form symbols, this choice is no longer arbitrary if symmetrical symbology is to be generated. An example of this problem is illustrated by the letter "V" of FIG. 3A. This symbol, which is clearly unsymmetrical, was generated with a vector having DX = +3 and DY = −8 (as in the previous example), followed by a vector with DX = +3 and DY = +8. Table 1B delineates the accumulator values after each clock cycle of the first vector. After clock cycle 4, the integer values of X and Y are equal to +2 and −4, respectively, (i.e., as the accumulator values are expressed in the binary 2's complement number system). At Y = −4, the actual vector is at X = 1.5. Therefore, it is mathematically arbitrary whether the pixel at X=1, Y=−4 or the pixel at X=2, Y=−4 is illuminated. Similarly, for the second vector it is arbitrary whether the pixel at X=4, Y=−4 or the pixel at X=5, Y=−4 is illuminated.

Figure 3A:
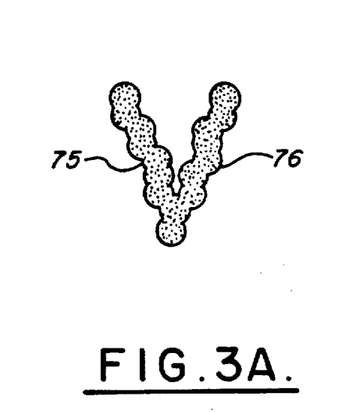
FIG. 3A is an illustration of the generation of the letter "V" in accordance with the present invention with the accumulators initialized to one-half.
Figure 3B:
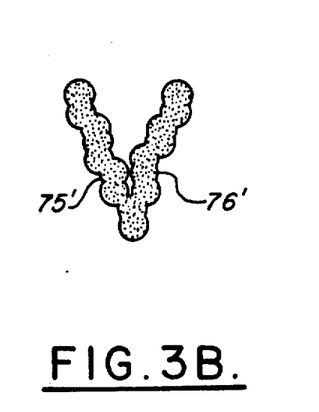
FIG. 3B is an illustration of the generation of the letter "V" in accordance with the present invention with the accumulators initialized to one-half minus 1 LSB.
Figure 3C:
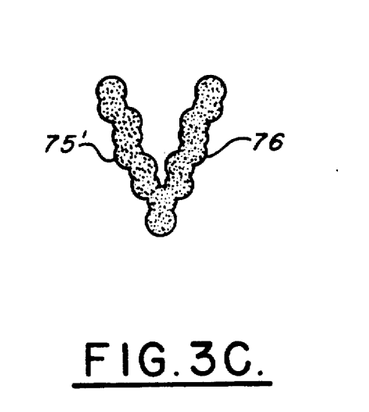
FIG. 3C is an illustration of the generation of the letter "V" in accordance with the invention utilizing a symmetrical algorithm.

FIG. 3A illustrates the symbol generated with the accumulator fractions initialized to ½. If the accumulator fractions are initialized to ½ less 1 LSB, then the opposite choices are effected with respect to which of the mathematically arbitrary pixels are illuminated. The symbol illustrated in FIG. 3B is thus generated. IF one of the vectors is initialized to ½, and the other initialized to ½ less 1 LSB, the resulting symbol will be symmetrical as illustrated in FIG. 3C. The mathematically arbitrary pixel in the first vector is denoted by reference numerals 75 and 75' and the mathematically arbitrary pixel of the second vector is denoted by reference numerals 76 and 76'. Thus, a further advantage of the present invention is illustrated by the comparison of the three examples of the generation of the letter "V" depicted in FIGS. 3A, 3B and 3C.

The present invention generates symmetrical symbology by initializing the accumulator fractions to the values of ½ less 1 LSB, and then enabling the accumulator carry input (lines 16, 36 of FIG. 1) on the first clock cycle of some vectors. Enabling the carry input on the first clock cycle is equivalent to initializing the accumulator fraction to ½, instead of to ½ less 1 LBS, and not enabling the carry input. The decision on whether to enable the carry input on the first clock cycle of a vector is predicated on the octant in which the vector to be generated resides.

FIG. 4 illustrates the octant definitions utilized in generating symmetrical symbology. The following Table 2 provides two algorithms for the generation of symmetrical symbology utilizing concatenated vectors with the tangent vector generation algorithm.

TABLE 2

| ALGORITHM | AXIS | CARRY INPUT ON 1ST CLOCK OCTANT # | | | | | | | |
|---|---|---|---|---|---|---|---|---|---|
| | | 0 | 1 | 2 | 3 | 4 | 5 | 6 | 7 |
| #1 | X | * | 1 | 1 | * | * | 0 | 0 | * |
| | Y | 0 | * | * | 1 | 1 | * | * | 0 |
| #2 | X | * | 0 | 0 | * | * | 1 | 1 | * |
| | Y | 1 | * | * | 0 | 0 | * | * | 1 |

* = DON'T CARE

The algorithms of Table 2 are implemented by a portion of the control logic 51 of the vector processor of FIG. 1. The X and Y carry input signals are applied to the lines 26 and 16, respectively.

In the embodiments of the invention heretofore described, the values DX/N and DY/N are provided by rounding to the LSB bit position of the accumulators. The aspects of the invention regarding symmetrical symbology, as discussed, did not consider the effect of truncation errors with respect to the choice between two mathematically arbitrary pixels. The possibility of truncation errors requires that, to guarantee the generation of symmetrical symbology using concatenated vectors, a different truncation algorithm must be utilized in providing the DX/N and DY/N signals. For K fractional bits, symmetrical symbology, as well as mathematically perfect vectors, can be generated with vectors having up to $2^{K/2}$ clock cycles. However, when the number of clock cycles is an even integer, the DX/N or DY/N value must be truncated for all vectors in octants with the carry input to the corresponding accumulator disabled on the first clock cycle of the vector. Also, when the number of clock cycles is an even integer, the DX/N or DY/N value must be rounded up, when not represented exactly in K fractional bits, for all vectors in octants with the carry input to the corresponding accumulator enabled on the first clock cycle of the vector. For vectors with an odd number of clock cycles, the DX/N and DY/N values are always rounded to the nearest LSB.

Alternatively, for K fractional bits, symmetrical symbology is generated if the maximum number of clock cycles in a vector is limited to $2^{(K-1)/2}$, and if the DX/N and DY/N values for all vectors (i.e., regardless of whether the number of clock cycles is an even or odd integer) are determined in the same manner as described above for the vectors having an even number of clock cycles.

It is appreciated that the software system that establishes the value for the slope 108 of the tan vector instruction word of FIG. 1A accommodates the above-described limitations so that symmetrical symbology is generated in the presence of truncation errors.

Figure 5A:
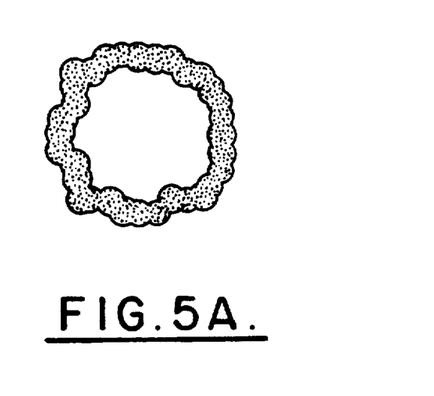
FIG. 5A is an illustration of the generation, in accordance with the invention, of an octagon utilizing concatenated vectors without using a symmetrical algorithm of the present invention.
Figure 5B:
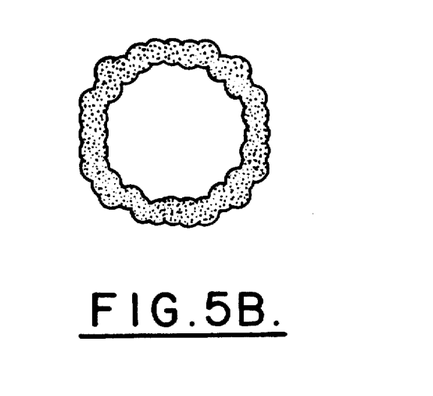
FIG. 5B is an illustration of the generation, in accordance with the invention, of an octagon utilizing concatenated vectors using a symmetrical algorithm of the present invention.

Referring again to FIGS. 3A-3C, the advantage of symmetrical symbology generated in accordance with the present invention is exemplified by a comparison of FIG. 3C, which was generated by algorithm number 1 of Table 2 above, with FIGS. 3A and 3B which are non-symmetrical. Referring to FIGS. 5A and 5B, the advantages of the symmetrical symbology aspect of the present invention are further exemplified. FIG. 5A illustrates the generation of an octagon in a counterclockwise direction with mathematically perfect concatenated vectors. The accumulator fractions are initialized to one-half in accordance with the invention. The octagon of FIG. 5B is generated in the counterclockwise direction utilizing concatenated vectors with algorithm #1 of Table 2. The advantages of the present invention regarding the generation of symmetrical symbology are appreciated by comparing the appearance of the octagon of FIG. 5B with that of FIG. 5A.

As previously described, the present invention can utilize the sine/cosine vector generation algorithm to eliminate error accumulation when generating concatenated vectors. Unlike the tangent algorithm, however, the sine/cosine algorithm cannot generate mathematically perfect vectors. Nevertheless, the sine/cosine algorithm can be utilized to generate symmetrical symbology with concatenated vectors. The following Table 3 defines four symmetry algorithms for sine/cosine vector generation.

TABLE 3

| ALGORITHM | AXIS | CARRY INPUT ON 1ST CLOCK OCTANT # | | | | | | | |
|---|---|---|---|---|---|---|---|---|---|
| | | 0 | 1 | 2 | 3 | 4 | 5 | 6 | 7 |
| #1 | X | 1 | 1 | 1 | 1 | 0 | 0 | 0 | 0 |
| | Y | 0 | 0 | 1 | 1 | 1 | 1 | 0 | 0 |
| #2 | X | 0 | 0 | 0 | 0 | 1 | 1 | 1 | 1 |
| | Y | 1 | 1 | 0 | 0 | 0 | 0 | 1 | 1 |
| #3 | X | 0 | 1 | 1 | 0 | 1 | 0 | 0 | 1 |
| | Y | 0 | 1 | 0 | 1 | 1 | 0 | 1 | 0 |
| #4 | X | 1 | 0 | 0 | 1 | 0 | 1 | 1 | 0 |
| | Y | 1 | 0 | 1 | 0 | 0 | 1 | 0 | 1 |

The octant definition with respect to Table 3 is illustrated in FIG. 4. It is noted that the algorithms utilized to generate symmetrical symbology using the sine/cosine technique are similar to those for the tangent algorithm, except that the accumulator carry inputs on the first clock cycle are never "Don't Cares," as is the situation in half of the table entries of Table 2 above.

Referring to FIG. 6, an annotated octagon is illustrated for use in the development of the symmetry algorithms. The octagon is drawn with concatenated vectors in the counterclockwise direction and the numbers inside the octagon denote the octant of each such vector. The notations outside the octagon provide the X and Y directions from each vector toward the outside of the octagon. Specifically, the notations outside the octagon comprise two notations associated with each vector, one of which is either X+ or X−, and the other of which is either Y+ or Y−. For each vector, the notations indicate which X direction (i.e., X+ or X−) and which Y direction, is on the side of the vector that lies outside of the octagon. Enabling the carry input of the first clock cycle will bias an accumulator, and the associated component of the generated vector, toward the positive direction (i.e., toward the X+ or Y+ direction). Similarly, by disabling the carry input on the first clock cycle, the accumulator is biased toward the negative direction (i.e., toward X− or Y−). Symmetrical symbology is generated if the carry inputs to the accumulators are selected in accordance with the bias that is shown in FIG. 6 to always select between mathematically arbitrary pixels such that the pixel towards the outside of the octagon will be illuminated. Assuming that the octagon is drawn in the counterclockwise direction, this selection results in algorithm #1 of Table 2, for vectors generated with the tangent algorithm, and algorithm #1 of Table 3, for vectors generated with the sine/cosine algorithm. Symmetry will also result if the carry inputs are selected so that the pixels toward the inside of the octagon are illuminated. This results in algorithm #2 in both Tables 2 and 3. It is noted that algorithm #1 illuminates the pixels that are toward the outside of the octagon only when the octagon is drawn in the counterclockwise direction and illuminates the pixels that are toward the inside when the octagon is drawn in the clockwise direction. Similarly, algorithm #2 illuminates the inside pixels when drawing the octagon in the counterclockwise direction, and the outside pixels when drawing in the clockwise direction.

For the sine/cosine technique, two additional algorithms are provided for the generation of symmetrical symbology. Algorithm #3 of Table 3 results from the selection of the outside pixels for the axis that corresponds to the shortest component of each vector, and the selection of the inside pixels for the axis that corresponds to the longest component of each vector, when the octagon is generated in the counterclockwise direction. Similarly, algorithm #4 results from the selection of the inside pixels for the axis that corresponds to the shortest component of each vector, and the selection of the outside pixels for the axis that corresponds to the longest component of each vector, when the octagon is generated in the counterclockwise direction. In the manner described above with respect to Table 2, Table 3 is implemented by a portion of the control logic 51.

As described above, the present invention eliminates truncation errors at the vector end point. The following is an error analysis for the correct vector end point and provides a derivation of the maximum error at a vector end point.

Assume a vector is drawn from point $X_1$, $Y_1$, to $X_2$, $Y_2$. Then, $DX = X_2 - X_1$ and $DY = Y_2 - Y_1$, where DX and DY are integers. If a total of N clock cycles are used to generate the vector, the incremental values that should be added to the X and Y accumulators at each clock cycle are given by DX/N and DY/N, respectively. Consider only the error in the Y accumulator. The analysis is also valid for the X accumulator because of symmetry.

The actual value added to the Y accumulator on every clock cycle is given by DY/N+e, where the error term, e, is given by:

$$e = \text{Actual value} - \text{Correct Value} = [DY/N + e] - DY/N \quad (1)$$

The error term results from the necessity of representing DY/N with a finite number of fractional bits. If DY/N is an irrational number, then its exact representation in 2's complement binary requires an infinite number of fractional bits. If the accumulator has K fractional bits, the weight of the Least Significant Bit (LSB) of the accumulator is equal to $2^{-K}$. In the exact 2's complement representation of DY/N, all the bit positions to the right of the $K^{TH}$ fractional bit contribute some value, E, to the total amount of DY/N (where E is greater than, or equal to, zero; and is less than $2^{-K}$). If the value added to the accumulator is derived by dropping (i.e., truncating) the value E from the exact representation of DY/N, e will be given by:

$$e = -E \text{ (for truncation)} \quad (2)$$

If, for the case when $E \geq \frac{1}{2}$ LSB, the value added to the accumulator is rounded up (i.e., by adding +1 to the LSB and truncating the value E), then $$e = LSB - E \text{ (for rounding up)} \quad (3)$$

The integer portion of the Y accumulator is initially loaded with the value $Y_1$, and the fractional portion of the accumulator is initialized to the value of $\frac{1}{2}$ or the value $\frac{1}{2}$ less 1 LSB. If the initial fractional value of Y is designated as F, then the value of the Y accumulator at the vector end point (i.e., after N clock cycles), is given by:

$$Y = Y_1 + F + [(DY/N) + e]N = Y_1 + DY + F + e.N \quad (4)$$

where $Y_1$ and DY are integers and F is the initial value of the fraction. If no error is allowed in the integer value of the Y accumulator, then:

$$0 \leq F + e.N < 1 \quad (5)$$

Using worst case values of F (i.e., $\frac{1}{2}$ for the positive limit and $\frac{1}{2}$ less 1 LSB for the negative limit), and solving for e, gives:

$$-(\tfrac{1}{2}N) + (LSB/N) \leq e < \tfrac{1}{2}N \quad (6)$$

The number of fractional bits in the accumulators must be large enough so that the error term in the incremental value added to the accumulator is within the range defined by inequality 6; where N is the number of clock cycles used to generate a vector, and LSB is the value of the least significant bit of the accumulator. This will ensure that the integer value of the accumulator will not be in error at the vector end point. The fractional portions of the accumulators can then be initialized (i.e., loaded with $\frac{1}{2}$ or with $\frac{1}{2} - 1$ LBS) on the last clock cycle of every vector. This will prevent error build up on consecutive vectors.

If K bits are available to define the value N, then the maximum number of clock cycles is equal to $2^K$. (Note the zero length vectors can be disallowed. The value of N can then be defined as one greater than the number defined within the K bits). It will now be shown with $N \leq 2^K$, a total of K fractional bits are sufficient to meet the requirements of 6).

The worst case value of N, relative to inequality 6), is given by $2^K - 1$ (note that e will be 0 for $N = 2^K$). Substituting into 6), with $LSB = 2^{-K}$, gives:

$$-\frac{1}{2^{K+1} - 2} + \frac{2^{-K}}{2^K - 1} \leq e < \frac{1}{2^{K+1} - 2} \quad (7)$$

The actual value used for DY/N can include an error value, e, due to the limitation of K fractional bits. If any number between $-1$ and $+1$ were possible for the correct value of DY/N, then by rounding to the closest LSB (i.e., nearest $2^{-K}$), the actual range of e would be given by:

$$-\frac{1}{2^{K+1}} < e \leq \frac{1}{2^{K+1}} \quad (8)$$

If the actual range of e (given by inequality 8) lies within the required range (given by inequality 7), then K fractional bits would indeed be sufficient to prevent integer errors at the end point. This is clearly the case for the positive limits of the inequalities. It is not, however, the case for the negative limits. If inequality (6) is solved for $N = 2^K - 2$, then the result is given by:

$$-\frac{1}{2^{K+1} - 4} + \frac{2^{-K}}{2^K - 2} \leq e < \frac{1}{2^{K+1} - 4} \quad (9)$$

It can be demonstrated that the negative limit of 8) is equal to the negative limit requirement of 9). Therefore, K fractional bits are sufficient to prevent integer errors with vectors having $2^K - 2$, or fewer, clock cycles. Inequality 8) was derived under the assumption that DY/N could be any value between $-1$ and $+1$. Because this is not precisely true, the negative limit of inequality 8) is less than the value that can actually occur. The limit assumed a truncated value, E, that is arbitrarily close to (but still less than) the value of ½ LSB (where ½ LSB = $2^{-K-1}$). A more exact value for the negative limit of e will now be determined.

If the correct value to be added to the Y accumulator, DY/N, is divided by the weight of the LSB (i.e., by $2^{-K}$), this has the effect of moving the binary point to the right by K bit-positions. Therefore, the fractional portion of the result of this division will consist of all the bits to be truncated in deriving the value that will be used to approximate DY/N (i.e., in deriving the value (DY/N)+e). If the worst case fractional result of this division (i.e., the fraction that is closest to, but still less than, ½) is multiplied by the weight of the LSB, this will give the magnitude of the worst case negative limit for e.

The previously prescribed division can be expressed as:

$$\frac{(DY)}{(N)} \cdot \frac{1}{LSB} = Q + \frac{R}{N} \quad (10)$$

where Q is an integer and R is a positive integer that is less than N. The largest value of R/N that is less than ½ occurs when N is the largest possible odd integer. It is given by:

$$\text{Fraction} = \frac{N/2 - 1/2}{N} = \frac{N - 1}{2N} \quad (11)$$

The magnitude of the negative error limit can now be determined by multiplying this fraction by the LSB (i.e., where $LSB = 2^{-K}$ and $N = 2^K - 1$). The result is given by:

$$\text{Neg. limit} = -\frac{2^K - 1 - 1}{2(2^K - 1)} (2^{-K}) = \quad (12)$$

$$-\frac{1}{2^{K+1} - 2} + \frac{2^{-K+1}}{2^{K+1} - 2}$$

Substituting this value for the negative limit of inequality 8) gives:

$$-\frac{1}{2^{K+1} - 2} + \frac{2^{-K+1}}{2^{K+1} - 2} \leq e \leq \frac{1}{2^{K+1}} \quad (13)$$

Inequality 13) gives the actual limits in the error term of the value that is added to the accumulator (i.e., for K fractional bits and $2^K$ maximum clock cycles). These limits lie within the required limits that are given by inequality 7). (In fact, the negative limits of inequalities 7) and 13) are equal). Therefore, no error can occur in the integer bits of the accumulators at the vector end point when: 1) The accumulator fractions are initialized to either ½ or ½ − 1 LSB. 2) K fractional bits are available for the accumulator; 3) the value added to an accumulator is rounded to the nearest LSB (i.e., to the $K^{TH}$ fractional bit); and 4) a maximum of $2^K$ clock cycles is used to generate the vector.

Increasing the fractional resolution of the accumulators beyond that required for the elimination of vector end-point errors, can, with the tangent algorithm, result in the generation of mathematically perfect vectors. The following error analysis derives the resolution requirements for mathematically perfect vectors. The requirements for combining symmetrical symbology with mathematically perfect vectors are also derived.

Assume a vector is drawn from point $X_1$, $Y_1$ to point $X_2$, $Y_2$. Let $X_2 - X_1 = N$, and $Y_2 - Y_1 = M$. Both N and M are integers. Consider the tangent algorithm with $|N|$ clock cycles (i.e., $|N| \geq |M|$.

CASE #1

Initial value of accumulator fraction = ½. The "correct" value for the Y accumulator after clock cycle "i" (i.e., with no truncation errors) is given by:

$$Y_C(i) = Y_1 + \frac{1}{2} + \frac{M}{|N|} \cdot i \quad (14)$$

But the approximate value that is added to the Y accumulator is given by: $(M/|N|) + e$, where the error term, e, results from truncation (and possibly from rounding). Therefore, the "actual" value of Y after clock cycle i is:

$$Y_A(i) = Y_1 + \frac{1}{2} + \frac{M}{|N|} \cdot i + e \cdot i \quad (15)$$

Note that e is given by:

$e$ = Actual slope value − Correct slope
value = $[(M/|N|)+e] - M/|N|$ (16)

Therefore, if the value E (as defined above) is dropped (or truncated) from the correct value to form the actual value used, then:

$e = -E$ (for truncation) (17)

If the actual value is derived by rounding up (i.e., by adding +1 to the LSB and then truncating the value E) (i.e., when $E \geq \frac{1}{2}$ LSB), then:

$e = LSB - E$ (for rounding up) (18)

The term, $(M/|N|) \cdot i$, in equations 14) and 15) can be expressed as:

$$\frac{M}{|N|} \cdot i = Q + \frac{R}{|N|}, \quad (19)$$

where Q and R are both integers, and $|R/N| < 1$. Substituting into equations 14) and 15) gives:

$$Y_C(i) = Y_1 + \tfrac{1}{2} + Q + \frac{R}{|N|} \quad (20)$$

$$Y_A(i) = Y_1 + \tfrac{1}{2} + Q + \frac{R}{|N|} + e \cdot i \quad (21)$$

The highest susceptibility to an error in the integer value of the Y accumulator occurs when $R/|N|$ is very close to (but not equal to) $+\frac{1}{2}$ or $-\frac{1}{2}$. (When $R/|N| = \pm\frac{1}{2}$, either of two integers is a "mathematically" equivalent approximation to the Y value. Therefore, this case is relevant to generating symmetrical symbols (e.g., N=6, M=1 or 5), but is not a worst case for generating "mathematically" correct vectors). The $R/|N|$ term will be closest to $\pm\frac{1}{2}$ when N is an odd integer, and when N is large. For these cases, $$R = \pm\frac{N}{2} \pm \tfrac{1}{2} \quad (22)$$

where N is an odd integer. Substituting into 20) and 21) gives:

$$Y_C(i) = Y_1 + \tfrac{1}{2} + Q \pm \tfrac{1}{2} \pm \tfrac{1}{2N} \quad (23)$$

$$Y_A(i) = Y_1 + \tfrac{1}{2} + Q \pm \tfrac{1}{2} \pm \tfrac{1}{2N} + ei \quad (24)$$

where the sign of the term $\pm\frac{1}{2}$ will be the same as the sign of the value Q, and N is a large odd integer.

If $Y_A(i)$ is to have the same integer value as $Y_C(i)$ the, from equations 23 and 24), $$-\left|\frac{1}{2N}\right| \leq ei < \left|\frac{1}{2N}\right|, \text{ and} \quad (25)$$

$$-\left|\frac{1}{2Ni}\right| \leq e < \left|\frac{1}{2Ni}\right| \quad (26)$$

The most stringent requirement on e occurs when N is the largest magnitude odd integer, and when i is given by:

$$i = |N| - 1 \quad (27)$$

(Note that when $i = |N|$, the vector end point is attained and the error sensitivity is very low). Now, if L bits are available to specify the vector length (i.e., the number of clock cycles), and if zero length vectors are not allowed, then the maximum length is given by $2^L$, and the maximum odd value is:

$$N = 2^L - 1 \quad (28)$$

Substituting 27) and 28) into equation 26) gives:

$$-\frac{1}{2^{2L+1} - 2^{L+2} - 2^{L+1} + 4} \leq e < \quad (29)$$

$$\frac{1}{2^{2L+1} - 2^{L+2} - 2^{L+1} + 4}$$

It would therefore be sufficient (but not quite necessary) to require that:

$$-\frac{1}{2^{2L+1}} < e \leq \frac{1}{2^{2L+1}} \quad (30)$$

in order to prevent errors in the Y integer for Case #1 with the fraction initially equal to $\frac{1}{2}$. This requirement, which is more stringent than 29) is the result of rounding the value of M/N to the nearest value that can be represented with 2L fractional bits. Therefore, "mathematically" perfect vectors will result with 2L fractional bits, rounded slope values, and fractions initialized to $\frac{1}{2}$. It can be demonstrated that 2L−1 fractional bits would be insufficient for this case (e.g., with N=55, i=54, M=27).

CASE #2

Initial value of accumulator is equal to $\frac{1}{2}$ less the LSB of the accumulator fraction.

This case is of interest primarily for the special case of forcing symmetrical symbology for concatenated vectors. For vectors that are exactly between two pixels, the system must control which of the pixels is illuminated if symmetrical symbols are to result.

As a first step, it will be determined if "mathematically" perfect vectors will result for the same criteria as for Case #1 (i.e., with L-bits for vector length, 2L fractional accumulator bits, and rounded values of M/N). The "arbitrary" case of a vector being exactly between two pixels will not be considered.

The equations for the "Correct" value of Y and the "Actual" value of Y are given by:

$$Y_C(i) = Y_1 + 1/2 - LSB + \frac{M}{|N|} \cdot i, \text{ and} \quad (31)$$

$$Y_A(i) = Y_1 + \tfrac{1}{2} - LSB + \frac{M}{|N|} \cdot i + ei, \text{ where} \quad (32)$$

$$LSB = \frac{1}{2^{2L}} \quad (33)$$

Recalling from Case #1 that:

$$\frac{M}{|N|} \cdot i = Q + \frac{R}{|N|}, \text{ gives:} \quad (19)$$

$$Y_C(i) = Y_1 + \tfrac{1}{2} - LSB + Q + \frac{R}{|N|}, \text{ and} \quad (34)$$

-continued $$Y_A(i) = Y_1 + \frac{1}{2} - LSB + Q + \frac{R}{|N|} + ei \qquad 35)$$

The greatest susceptibility to an error in the integer value of $Y_A(i)$ occurs when $R/|N|$ is close to (but not equal to) $+\frac{1}{2}$ or $-\frac{1}{2}$. (Note that when $R/|N| = \pm \frac{1}{2}$, then the vector will be exactly between two pixels and it is mathematically arbitrary which pixel is illuminated. This case is not of immediate interest). The $R/|N|$ term will be closest to $\pm \frac{1}{2}$ when $$R = \pm \frac{N}{2} \pm \frac{1}{2}, \qquad 22)$$

where N is a large odd integer. Substituting into 34) and 35) gives:

$$Y_C(i) = Y_1 + \frac{1}{2} - LSB + Q \pm \frac{1}{2} \pm \frac{1}{2N} \qquad 36)$$

$$Y_A(i) = Y_1 + \frac{1}{2} - LSB + Q \pm \frac{1}{2} \pm \frac{1}{2N} + ei \qquad 37)$$

From equations 36) and 37)

$$-\frac{1}{2N} + LSB \leq ei < \frac{1}{2N} + LSB, \qquad 38)$$

if no error is to occur in the integer value of $Y_A$. Solving for e, and substituting 33), 28) and 27) for LSB, N and i, respectively, gives:

$$-\frac{1}{(2^{L+1} - 2)(2^L - 2)} + \frac{1}{2^{2L}(2^L - 2)} \leq e < \qquad 39)$$

$$\frac{1}{(2^{L+1} - 2)(2^L - 2)} + \frac{1}{2^{2L}(2^L - 2)}$$

The above expression defines the acceptable range of e for the generation of mathematically perfect vectors. The actual range of e for fractional bits with rounding of M/N was given by:

$$-\frac{1}{2^{2L+1}} < e \leq \frac{1}{2^{2L+1}} \qquad 30)$$

Since the acceptable range of e in 39) has a smaller magnitude for the negative limit of the range than for the positive limit, it will only be necessary to compare the negative limits of 30) and 39). If the magnitude of the acceptable negative limit of 39) is larger than (or equal to) the magnitude of the actual negative limit of 30), then 2L fractional bits are sufficient for mathematically perfect vectors. This is shown to be true as follows:

$$\frac{1}{(2^{L+1} - 2)(2^L - 2)} - \frac{1}{2^{2L}(2^L - 2)} \geq ? \frac{1}{2^{2L+1}}$$

$$\frac{2^{2L+1} - 2(2^{L+1} - 2)}{(2^{L+1} - 2)(2^L - 2)2^{2L+1}} \geq ? \frac{(2^{L+1} - 2)(2^L - 2)}{(2^{L+1} - 2)(2^L - 2)2^{2L+1}}$$

$$2^{2L+1} - 2^{L+2} + 4 \geq ? 2^{2L+1} - 2^{2L+2} - 2^{L+1} + 4$$
QED

It has now been demonstrated that "mathematically" perfect vectors will result when: the fractional portions of the accumulator are initialized to either $\frac{1}{2}$ or to $\frac{1}{2}$ less 1 LSB; the slope value is rounded to the nearest LSB; and 2L bits are available for the slope and accumulator fractions (i.e., where L bits define the vector length in terms of the number of accumulator clock cycles). When the desired vector lies exactly between two pixels, it is mathematically arbitrary which pixel is illuminated. However, if symmetrical symbology is desired when vectors are concatenated to form symbols, then it is no longer arbitrary which of these mathematically equivalent pixels is illuminated.

If the problem of truncation errors is neglected, then symmetrical symbols can be generated with chained vectors by using an algorithm that initializes the accumulator fractions to either $\frac{1}{2}$ or to $\frac{1}{2}$ less 1 LSB, depending on the direction (i.e., the octant) of the vector to be drawn. This can also be accomplished by always initializing the fractions to $\frac{1}{2}$ less 1 LSB, and then forcing a carry input to the accumulator/adder on the first clock cycle of vectors that are in selected octants. Then for octants with the carry input enabled (i.e., on the first clock cycle only), the larger, or more positive, of two mathematically equivalent integers (pixel locations) will be selected. For octants with the carry input disabled, the lesser, or more negative, of two mathematically equivalent integers is selected. This approach generates symmetrical symbology, using chained vectors, when the slope value is exact. When, however, the slope cannot be represented exactly by 2L fractional bits, then a different approach to truncation is required (i.e., other than rounding to the nearest LSB).

CASE #3

Symmetrical vectors for octants with carry input enabled.

This case is equivalent to initializing the accumulator fraction with $\frac{1}{2}$ and not enabling the carry input (i.e., as in Case #1). The equations for the correct and the actual values for the Y accumulator were given by:

$$Y_C(i) = Y_1 + \frac{1}{2} + Q + \frac{R}{|N|} \qquad 20)$$

$$Y_A(i) = Y_1 + \frac{1}{2} + Q + \frac{R}{|N|} + ei \qquad 21)$$

For the mathematically arbitrary case: $R/|N| = \pm \frac{1}{2}$. The carry input was enabled on the first clock cycle in order to force the larger of the mathematically equivalent integers for the Y accumulator. Therefore, considering only the case where $R/|N| = \pm \frac{1}{2}$, if no error is to be allowed in the integer value of $Y_A(i)$, then:

$$0 \leq e.i < 1 \qquad (40)$$

Of course, inequality 30) must still be met (i.e., in addition to 40), to meet the requirements for mathematically correct vectors. Inequality 40) requires that, for symmetrical symbology, a simple truncation can no longer be used on the slope value of vectors that are in octants that have the carry input enabled on the first clock cycle. If the slope value cannot be exactly represented, then it must always be rounded up to the next LSB. Using this method to derive the slope value, and meeting the requirements of both inequalities 30) and 40), would require a minimum of 2L+1 fractional bits for the accumulators and the slope value. The slope error would then be given by:

$$0 \leq e < \frac{1}{2^{2L+1}} \quad \text{41)}$$

By separating Case #3 into two distinct "subcases", and by using different algorithms for determining the slope values for these subcases, it is possible to have mathematically correct vectors and symmetrical symbology with only 2L fractional bits (i.e., instead of 2L+1 bits).

CASE #3A

Carry input enabled with N an odd integer.

It is noted that a vector can lie exactly between two pixels only when the term R/N of equations 20) and 21) is given by $\pm\frac{1}{2}$. But, since R and N are integers, this is only possible when N is an even integer. Therefore, when N is odd, the error term can be given by:

$$-\frac{1}{2^{2L+1}} < e \leq \frac{1}{2^{2L+1}}, \quad \text{30)}$$

as in Case #1. This requires 2L bits for the slope value with rounding to the nearest LSB.

CASE #3B

Carry input enabled with N an even integer.

The analysis of Case #1 examined the worst case error susceptibility, which occurs when N is an odd integer. Therefore, this must now be considered for the case with N an even integer. Equations 20) and 21) show that the highest susceptibility to an error in the integer value of $Y_A$ occurs when R/|N| is very close to (but not equal) $+\frac{1}{2}$ or $-\frac{1}{2}$. (The case for R/|N| = $\pm\frac{1}{2}$ pertains only to symmetrical symbols and results in the inequality of 40)).

The worst case error susceptibility for the case with N an even integer occurs when $$R = \pm \frac{N}{2} \pm 1 \quad \text{42)}$$

Substituting into equations 20) and 21) gives:

$$Y_C(i) = Y_1 + \frac{1}{2} + Q \pm \frac{1}{2} \pm \frac{1}{N} \quad \text{43)}$$

$$Y_A(i) = Y_1 + \frac{1}{2} + Q \pm \frac{1}{2} \pm \frac{1}{N} + ei \quad \text{44)}$$

Therefore, to prevent errors in the integer value of $Y_A(i)$ requires that:

$$-\frac{1}{|N|} \leq e \cdot i < \frac{1}{|N|} \quad \text{45)}$$

The most stringent requirement on e occurs for large values of N and i, and specially for $$N = 2^L - 2, \text{ and} \quad \text{(46)}$$

$$i = N - 1, \quad \text{(47)}$$

where L bits are available to specify the vector length. (Recall that N is an even integer, and note that $N = 2^L$ will not result in truncation errors for the slope value). Substituting 46) and 47) into 45) and solving e gives:

$$-\frac{1}{2^{2L} - (3)2^{L+1} + 6} \leq e < \frac{1}{2^{2L} - (3)2^{L+1} + 6} \quad \text{48)}$$

It would therefore be sufficient to require that:

$$-\frac{1}{2^{2L}} < e \leq \frac{1}{2^{2L}} \quad \text{49)}$$

which could be realized with 2L−1 fractional bits with rounding of the slope value to the nearest LSB. If, however, symmetrical symbology is required, then both 40) and 49) must be met. This gives:

$$0 \leq e \leq \frac{1}{2^{2L}} \quad \text{50)}$$

This requirement must be met when N is an even integer and the carry is enabled (on the first clock cycle), in order to force symmetrical symbology. The requirement is met with 2L fractional bits for the slope. When the slope value is not exact, it must always be rounded up to the next LSB value.

To complete the analysis for symmetrical symbology, the case for octants with the carry input disabled is now examined.

CASE #4

Symmetrical symbology for vectors in octants with the carry input disabled.

This case is similar to Case #2 and the equations for $Y_C$ and $Y_A$ were given by:

$$Y_C(i) = Y_1 + \frac{1}{2} - LSB + Q + \frac{R}{|N|} \quad \text{34)}$$

$$Y_A(i) = Y_1 + \frac{1}{2} - LSB + Q + \frac{R}{|N|} + ei \quad \text{35)}$$

For the mathematically arbitrary case: R/|N| = $\pm\frac{1}{2}$. If no error is allowed in the integer value of $Y_A$ for this case, then:

$$-1 + LSB \leq ei \leq 0 \quad \text{(51)}$$

(Note that the actual upper limit of "ei<1 LSB" has been simplified to "ei≤0". These limits are equivalent for all practical purposes due to the slope resolution of 1 LSB).

Combining the inequality of 51), required for symmetry, with the inequality of 30), required for mathematically correct vectors, gives:

$$-\frac{1}{2^{2L+1}} < e \leq 0 \quad \text{52)}$$

This range of slope error can be obtained by always truncating, or dropping, all fractional bits of lower significance than the LSB; and by using a minimum of 2L+1 fractional bits. However, only 2L fractional bits are required if this case is divided into two subcases, as was Case #3; and different algorithms are used for determining the slope values of each subcase.

CASE 4A

Symmetrical symbology; carry input disabled; and N is odd integer.

As noted in Case #3A, the term $R/|N|$ cannot equal $\pm \frac{1}{2}$ when N is odd. Therefore, this case is equivalent to Case #2. The error limits are given by 30), 2L fractional bits are required, and the slope value must be rounded to the nearest LSB.

CASE #4B

Symmetrical symbology; carry input disabled; and N is an even integer.

As with Case #3B, the worst case error susceptibility, for N an even integer, occurs when:

$$R = \pm \frac{N}{2} \pm 1 \qquad 42)$$

Substituting 42) into equations 34) and 35) and $Y_C$ and $Y_A$ gives $$Y_C(i) = Y_1 + \frac{1}{2} - LSB + Q \pm \frac{1}{2} \pm \frac{1}{N} \qquad 53)$$

$$Y_A(i) = Y_1 + \frac{1}{2} - LSB + Q \pm \frac{1}{2} \pm \frac{1}{N} + ei \qquad 54)$$

If no error is allowed in the $Y_A(i)$ integer, then:

$$-\frac{1}{N} + LSB \leq ei < \frac{1}{N} + LSB \qquad 55)$$

Substituting for LSB, N, and i in equation 55) (from equations 33), 46) and 47)) gives:

$$-\frac{1}{(2^L - 2)(2^L - 3)} + \frac{1}{2^{2L}(2^L - 3)} \leq e < \qquad 56)$$

$$\frac{1}{(2^L - 2)(2^L - 3)} + \frac{1}{2^{2L}(2^L - 3)}$$

It can be shown that more stringent limits are expressed by:

$$-\frac{1}{2^{2L}} < e \leq \frac{1}{2^{2L}} \qquad 57)$$

which requires only 2L−1 fractional bits with rounding. Combining 41) and 57), however, gives:

$$-\frac{1}{2^{2L}} < e \leq 0 \qquad 58)$$

This can be met with 2L fractional bits and truncation of the slope value (i.e., never rounding up).

The following is concluded from the foregoing Error Analysis for Perfect Vectors and Symmetrical Symbology.

1) For "Mathematically" Perfect Vectors (Tangent Algorithm)

Fractional portions of accumulators should be initialized to $\frac{1}{2}$, or to $\frac{1}{2}$ less 1 LSB, when accumulators are loaded (i.e., initial position instruction).

Fractional portions of accumulators should also be loaded with $\frac{1}{2}$, or $\frac{1}{2}$ less 1 LSB, on the last clock cycle of every vector. (This initializes fractions for the execution of consecutive vectors by clearing any error accumulation).

If the initialization value of $\frac{1}{2}$ less 1 LSB is used, then the adder carry input can be enabled on the first clock cycle of a vector. This has the same effect as changing the initialization value to $\frac{1}{2}$.

The slope value to be added to one of the accumulators should be rounded off to the nearest LSB.

If K bits are available for the slope and for the accumulator fractions, then vector lengths of up to $2^{K/2}$ clock cycles can be generated with mathematical perfection. (For an Accumulator with an 11-bit fraction, this allows mathematically perfect vectors of up to 45 steps).

Vectors that are longer than $2^{K/2}$ clock cycles, and therefore might not achieve mathematical perfection, can also be drawn. However, no vector longer than $2^K$ clock cycles should be drawn (where K is the number of fractional bits in the accumulator and in the rounded slope value). This restriction is necessary in order to guarantee that no errors will occur in the integer portions of the accumulators at vector end points.

It is noted that "Perfect Vectors" illuminate only pixels that lie within half of the pixel-to-pixel spacing from the actual desired vector.

2. For Symmetrical Symbology

Symmetrical symbology from chained vectors can be generated by controlling which of two pixels is illuminated when both are equally distant from the desired vector. This is achieved by always initializing the accumulator fractions to $\frac{1}{2}$ less 1 LSB and by enabling the carry input to an accumulator adder, or to both accumulator adders, on the first clock cycle of the vectors in certain octants.

Although symmetrical symbology can be achieved with either the SIN/COS or the tan vector generator algorithm, only the tan algorithm also results in the exclusive generation of mathematically perfect vectors. The basic resolution requirement for the accumulator fractions is, in fact, the same for the generation of symmetrical symbology as for the generation of mathematically perfect vectors with the tan algorithm. However, a different algorithm must be used to derive the values that are added to the accumulators. Two such algorithms are available.

For accumulators having K fractional bits, symmetry can be realized for all vectors that are generated with a maximum of $2^{K/2}$ clock cycles if: 1) the values added to the accumulators are derived by rounding to the Kth fractional bit for all vectors having an odd number of clock cycles; and 2) for vectors having an even number of clock cycles, the value added to an accumulator having the carry input disabled on all clock cycles is truncated to K fractional bits; and 3) also for vectors having an even number of clock cycles, the value added to an accumulator having the carry input enabled on only the first clock cycle of the vector is rounded up (i.e., by adding 1 to the Kth fractional bit position) when not represented exactly within the K fractional bits. Note that the carry inputs to the accumulators on the first clock cycle of each vector are determined by the octant of the generated vector according to one of the symmetry algorithms of Table 2 or Table 3.

Again for accumulators having K fractional bits, symmetry can also be realized for all vectors that are generated with a maximum of $2^{(K-1)/2}$ clock cycles if: 1) the value to be added to an accumulator having the carry input disabled on all clock cycles is truncated to K fractional bits; and if 2) the value added to an accumulator having the carry input enabled on only the first clock cycle is rounded up when not represented exactly within the available K fractional bits.

Neither of these algorithms, for deriving the values to be added to the accumulators, would normally be used for vectors having more than the maximum number of clock cycles for symmetry. The second algorithm can result in errors in the integer bits of the accumulators, at vector end points, for vectors having more than $2^{K-1}$ clock cycles.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Vector generator apparatus for generating a vector as a sequence of points from an initial point to an end point through intermediate points therebetween, each said point having first and second coordinates, said apparatus comprising:
   first digital accumulator means for accumulating coordinate values having a first integer portion and a first fractional portion, said first integer portion providing a signal representative of said first coordinate of each said point of said vector, said first fractional portion having at least significant bit,
   second digital accumulator means for accumulating coordinate values having a second integer portion and a second fractional portion, said second integer portion providing a signal representative of said second coordinate of each said point of said vector, said second fractional portion having a least significant bit, and
   first and second presetting means for presetting said first and second fractional portions, respectively, to a value of approximately one-half prior to generating said vector.

2. The apparatus of claim 1, wherein:
   said first presetting means comprises means for presetting said first fractional portion to a value selected from the group consisting of the value of one-half and the value of one-half less the value of said least significant bit of said first fractional portion, and
   said second presetting means comprises means for presetting said second fractional portion to a value selected from the group consisting of the value of one-half and the value of one-half less the value of said least significant bit of said second fractional portion.

3. The apparatus of claim 2 further including:
   clock means having clock cycles for controlling generating said points of said vector, said points of said vector being generated during said clock cycles, respectively, said clock cycles comprising an initial clock cycle, intermediate clock cycles and a final clock cycle during which said initial point, intermediate points and end point are generated, respectively,
   first incrementing means for providing a first incremental value signal to said first accumulator means for accumulation therein during at least each said intermediate clock cycle, and
   second incrementing means for providing a second incremental value signal to said second accumulator means for accumulation therein during at least each said intermediate clock cycle.

4. The apparatus of claim 3 wherein
   said vector is generated in a predetermined number of said clock cycles, and
   said first and second fractional portions each comprise a number of bits such that any build-up of accumulator errors resulting from truncation or round-up errors in said first and second incremental value signals are limited, at said end point of said vector, to said fractional portions.

5. The apparatus of claim 4 wherein:
   said first and second fractional portions each comprise K bits,
   said first and second incrementing means comprises means for providing said first and second incremental value signals rounded to the nearest least significant bit of said first and second accumulator means, and
   means for limiting said clock cycles utilized to generate said vector a maximum value selected from the group consisting of $2^K$ and $2^{K/2}$.

6. The apparatus of claim 1 wherein each said first and second accumulator means has a carry input and said first and second presetting means comprises:
   means for presetting said first fractional portion to a preset value of one-half less the value of said least significant bit of said first fractional portion,
   means for presetting said second fractional portion to a preset value of one-half less the value of said least significant bit of said second fractional portion,
   first carry enabling means for selectively enabling said carry input of said first accumulator means so as to add the value of said least significant bit of said first fractional portion to said preset value in said first fractional portion to effectively change said preset value to one-half, and
   second carrying enabling means for selectively enabling said carry input of said second accumulator means so as to add the value of said least significant bit of said second fractional portion to said preset value in said second fractional portion to effectively change said preset value to one-half.

7. The apparatus of claim 6 wherein:
   said vector is generated at an angle residing in one of a plurality of angular sectors, and
   said first and second carrying enabling means comprises means for selectively enabling said carry inputs of said first and second accumulator means in accordance with said angular sector so that said vector generator apparatus generates symmetrical symbology.

8. The apparatus of claim 7 wherein said plurality of angular sectors comprise eight octants.

9. The apparatus of claim 8 further including:
   clock means having clock cycles for controlling generating said points of said vector, said points of said vector being generated during said clock cycles, respectively, said clock cycles comprising an initial clock cycle, intermediate clock cycles and a final clock cycle during which said initial point, intermediate points and end point are generated, respectively,
   first incrementing means for providing a first incremental value signal to said first accumulator means for accumulation therein during at least each said intermediate clock cycle, and second incrementing means for providing a second incremental value signal to said second accumulator means for accumulation therein during at least each said intermediate clock cycle.

10. The apparatus of claim 9 further including means for limiting said clock cycles utilized to generate said vector to a maximum of $2^{(k-1)/2}$ clock cycles and wherein said first and second fractional portions each comprise K bits, said first incrementing means comprises means for providing said first incremental signal rounded up, when not represented exactly in K fractional bits, whenever said first carry enabling means is enabling said carry input of said first accumulator means and for providing said first incremental signal truncated whenever said first carry enabling means is disabling said carry input of said first accumulator means, and said second incrementing means comprises means for providing said second incremental signal rounded up, when not represented exactly in K fractional bits, whenever said second carry enabling means is enabling said carry input of said second accumulator means and for providing said second incremental signal truncated whenever said second carry enabling means is disabling said carry input of said second accumulator means.

11. The apparatus of claim 9 wherein said vector is generated in a predetermined number of said clock cycles, and said first and second fractional portions each comprise a number of bits such that any build-up of accumulator errors resulting from truncation or round-up errors in said first and second incremental value signals are limited, at said end point of said vector, to said fractional portions.

12. The apparatus of claim 11 further including means for limiting said clock cycles utilized to generate said vector to a maximum of $2^{K/2}$ clock cycles and wherein said first and second fractional portions each comprise K bits.

13. The apparatus of claim 12 wherein said number of clock cycles for generating said vector comprises an even integer, said first incrementing means comprises means for providing said first incremental signal rounded up, when not represented exactly in K fractional bits, whenever said first carry enabling means is enabling said carry input of said first accumulator means and for providing said first incremental signal truncated whenever said first carry enabling means is disabling said carry input of said first accumulator means, and said second incrementing means comprises means for providing said second incremental signal rounded up, when not represented exactly in K fractional bits, whenever said second carry enabling means is enabling said carry input of said second accumulator means and for providing said second incremental signal truncated whenever said second carry enabling means is disabling said carry input of said second accumulator means.

14. The apparatus of claim 12 wherein said number of clock cycles for generating said vector comprises an odd integer, said first incrementing means comprises means for providing said first incremental signal rounded to the nearest least significant bit of said first accumulator means, said second incrementing means comprises means for providing said second incremental signal rounded to the nearest least significant bit of said second accumulator means.

15. The apparatus of claim 8 wherein said first and second carry enabling means comprises means for enabling said carry input of said first accumulator means and said carry input of said second accumulator means in accordance with an algorithm selected from the group consisting of algorithm 1 and algorithm 2 of Table 2.

16. The apparatus of claim 8 wherein said first and second carry enabling means comprises means for enabling said carry input of said first accumulator means and said carry input of said second accumulator means in accordance with an algorithm selected from the group consisting of algorithm 1, algorithm 2, algorithm 3 and algorithm 4 of Table 3.

17. Vector generator apparatus for generating a vector as a sequence of points from an initial point to an end point through intermediate points therebetween, each said point having first and second coordinates, said vector being generated at an angle residing in one of a plurality of angular sectors, said apparatus comprising:

first integer accumulator means for accumulating integer values and providing a signal representative of said first coordinate of each said point of said vector, second integer accumulator means for accumulating integer values and providing a signal representative of said second coordinate of each said point of said vector, a fractional accumulator having a least significant bit and providing an overflow signal to said first integer accumulator means or said second integer accumulator means in accordance with said angular sector, and presetting means for presetting said fractional accumulator to a value of approximately one-half prior to generating said vector.

18. The apparatus of claim 17 wherein said presetting means comprises means for presetting said fractional accumulator to a value selected from the group consisting of the value of one-half and the value of one-half less the value of said least significant bit of said fractional accumulator.

19. The apparatus of claim 17 wherein said fractional accumulator has a carry input and said presetting means comprises:

means for presetting said fractional accumulator to a preset value of one-half less the value of said least significant bit of said fractional accumulator, and carry enabling means for selectively enabling said carry input of said fractional accumulator in accordance with said angular sector so as to add the value of said least significant bit of said fractional accumulator to said preset value in said fractional accumulator to effectively change said preset value to one-half, so that said vector generator apparatus generates symmetrical symbology.

* * * * *

UNITED STATES PATENT AND TRADEMARK OFFICE
CERTIFICATE OF CORRECTION

PATENT NO. : 5,070,466
DATED : December 3, 1991
INVENTOR(S) : Bruce M. Anderson and Brian E. Broderick It is certified that error appears in the above-indentified patent and that said Letters Patent is hereby corrected as shown below:

Column 27, line 28, cancel "at" and substitute --a--.

Column 28, line 38, cancel "carrying" and substitute --carry--;

Column 28, line 47, cancel "carrying" and substitute --carry--.

Signed and Sealed this

Twenty-second Day of March, 1994

Attest:

BRUCE LEHMAN

Attesting Officer     Commissioner of Patents and Trademarks